US010019839B2

(12) United States Patent
Kohler et al.

(10) Patent No.: US 10,019,839 B2
(45) Date of Patent: Jul. 10, 2018

(54) THREE-DIMENSIONAL OBJECT SCANNING FEEDBACK

(71) Applicant: MICROSOFT TECHNOLOGY LICENSING, LLC, Redmond, WA (US)

(72) Inventors: Jeffrey Kohler, Redmond, WA (US); Shawn Crispin Wright, Sammamish, WA (US); Jason Bradley Scott, Bellevue, WA (US); John Copic, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 10 days.

(21) Appl. No.: 15/199,480

(22) Filed: Jun. 30, 2016

(65) Prior Publication Data

US 2018/0005433 A1    Jan. 4, 2018

(51) Int. Cl.
*G06T 17/00* (2006.01)
*G06T 19/00* (2011.01)
(Continued)

(52) U.S. Cl.
CPC ............ *G06T 17/00* (2013.01); *G02B 27/017* (2013.01); *G05B 19/4207* (2013.01);
(Continued)

(58) Field of Classification Search
CPC ....... G06T 17/00; G06T 19/20; G06T 19/006; G06T 2200/04; G05B 19/4207; G02B 27/017
See application file for complete search history.

(56) References Cited

U.S. PATENT DOCUMENTS 5,306,908 A    4/1994    McConica et al.
6,201,889 B1    3/2001    Vannah
(Continued)

FOREIGN PATENT DOCUMENTS

WO    2012071466 A2    5/2012

OTHER PUBLICATIONS

Goncu, et al., "Comparison of Haptic and Non-Speech Audio Feedback", in 7th International Conference of the Theory and Application of Diagrams, Jul. 2, 2012, pp. 26-32.
(Continued)

*Primary Examiner* — Maurice L. McDowell, Jr.
(74) *Attorney, Agent, or Firm* — Alleman Hall Creasman & Tuttle LLP

(57) ABSTRACT

Examples of providing feedback regarding a scan of a three-dimensional object are described. In one example, a method of computer modeling a three-dimensional object includes computer-tracking a three-dimensional pose of a scanning device relative to the three-dimensional object as the three-dimensional pose of the scanning devices changes to measure different contours of the three-dimensional object from different vantage points, and assessing a sufficiency of contour measurements from one or more of the different vantage points based on measurements received from the scanning device. The example method further includes providing haptic feedback, via a haptic output device, indicating the sufficiency of contour measurements corresponding to a current three-dimensional pose of the scanning device.

20 Claims, 7 Drawing Sheets

(51) Int. Cl.
    *G02B 27/01*     (2006.01)
    *G06T 19/20*     (2011.01)
    *G05B 19/42*     (2006.01)

(52) U.S. Cl.
    CPC ............ *G06T 19/006* (2013.01); *G06T 19/20* (2013.01); *G06T 2200/04* (2013.01)

(56) References Cited

U.S. PATENT DOCUMENTS

| | | | |
|---|---|---|---|
| 7,256,899 B1 * | 8/2007 | Faul | G01B 11/2522 |
| | | | 345/420 |
| 7,813,591 B2 | 10/2010 | Paley et al. | |
| 8,189,965 B2 | 5/2012 | Edgar et al. | |
| 8,331,775 B2 | 12/2012 | Harper | |
| 8,416,301 B2 | 4/2013 | Lindop et al. | |
| 8,849,015 B2 | 9/2014 | Bodony et al. | |
| 2002/0023957 A1 | 2/2002 | Michaelis et al. | |
| 2002/0079371 A1 | 6/2002 | Bobrow et al. | |
| 2006/0061545 A1 | 3/2006 | Hughes et al. | |
| 2011/0102763 A1 | 5/2011 | Brown et al. | |
| 2013/0246222 A1 | 9/2013 | Weerasinghe | |
| 2014/0363048 A1 | 12/2014 | Vrcelj et al. | |
| 2014/0368620 A1 | 12/2014 | Li et al. | |
| 2015/0040005 A1 | 2/2015 | Faaborg et al. | |
| 2015/0161701 A1 | 6/2015 | Bretscher et al. | |

OTHER PUBLICATIONS

Poppinga, et al., "Towards an Objective Comparison of Scanning-Based Interaction Techniques", In Proceedings of 7th International Conference on Haptic and Audio Interaction Design, Aug. 23, 2012, pp. 1-10.

Diaz, et al., "Toward Haptic Perception of Objects in a Visual and Depth Guided Navigation", In Proceedings of IEEE International Conference on Systems, Man and Cybernetics, Oct. 5, 2014, pp. 3470-3475.

"International Search Report and Written Opinion Issued in PCT Application No. PCT/US2017/037093", dated Sep. 11, 2017, 15 Pages.

* cited by examiner

THREE-DIMENSIONAL OBJECT SCANNING FEEDBACK

BACKGROUND

An object may be imaged or otherwise scanned from multiple perspectives in order to determine physical features of the object. A three-dimensional model of the object may be generated using data from scanning the object. The quality of the three-dimensional model may depend upon the amount of the object that has been scanned and a quality of scanning data acquired for the object.

SUMMARY

Examples of providing feedback regarding a scan of a three-dimensional object are described. In one example, a method of computer modeling a three-dimensional object includes computer-tracking a three-dimensional pose of a scanning device relative to the three-dimensional object as the three-dimensional pose of the scanning devices changes to measure different contours of the three-dimensional object from different vantage points, and assessing a sufficiency of contour measurements from one or more of the different vantage points based on measurements received from the scanning device. The example method further includes providing haptic feedback, via a haptic output device, indicating the sufficiency of contour measurements corresponding to a current three-dimensional pose of the scanning device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A three-dimensional object may be modeled for a wide array of purposes, such as facilitating real-world and/or virtual replication of the object. For example, an object may be modeled so that a replica of the object may be manufactured. As another example, an object may be modeled so that the object may be represented in a virtual or augmented environment displayed on a virtual or augmented display device. In an augmented scene, the surfaces of the object may be modeled in order to allow virtual objects to interact with the object as they would in the real-world. Additionally or alternatively, the surfaces of the object may be modeled in order to allow the surfaces to be overlaid with virtual textures or objects in a seamless manner.

In order to model the three-dimensional object, a scanning device may detect contour features of the object from multiple vantage points. For example, a scanning device may sweep (e.g., project scanning light/audio) over surfaces of the object in order to capture contour measurements from the surfaces. A model may be generated based on the contour measurements as the measurements are acquired, such that the model is complete when all surfaces of the object have been scanned sufficiently. In order to keep a user informed as to the progress of the scan (e.g., in real-time), this disclosure provides examples for providing feedback regarding a state of the scan. For example, the feedback may indicate a progress of the scan (e.g., via display of a virtualization of the object as the virtualization is generated and/or an indication of regions that should be scanned or other affordance as to what the user should do next to further progress the scanning) and/or feedback for assisting the user in completing the scan (e.g., an indication of a field of view of the scanner, a speed of the scanner, a distance of the scanner from the object, and/or other parameters of the scanning operation). In this way, a user may be informed regarding progress towards a sufficient scan of the object.

Figure 1:
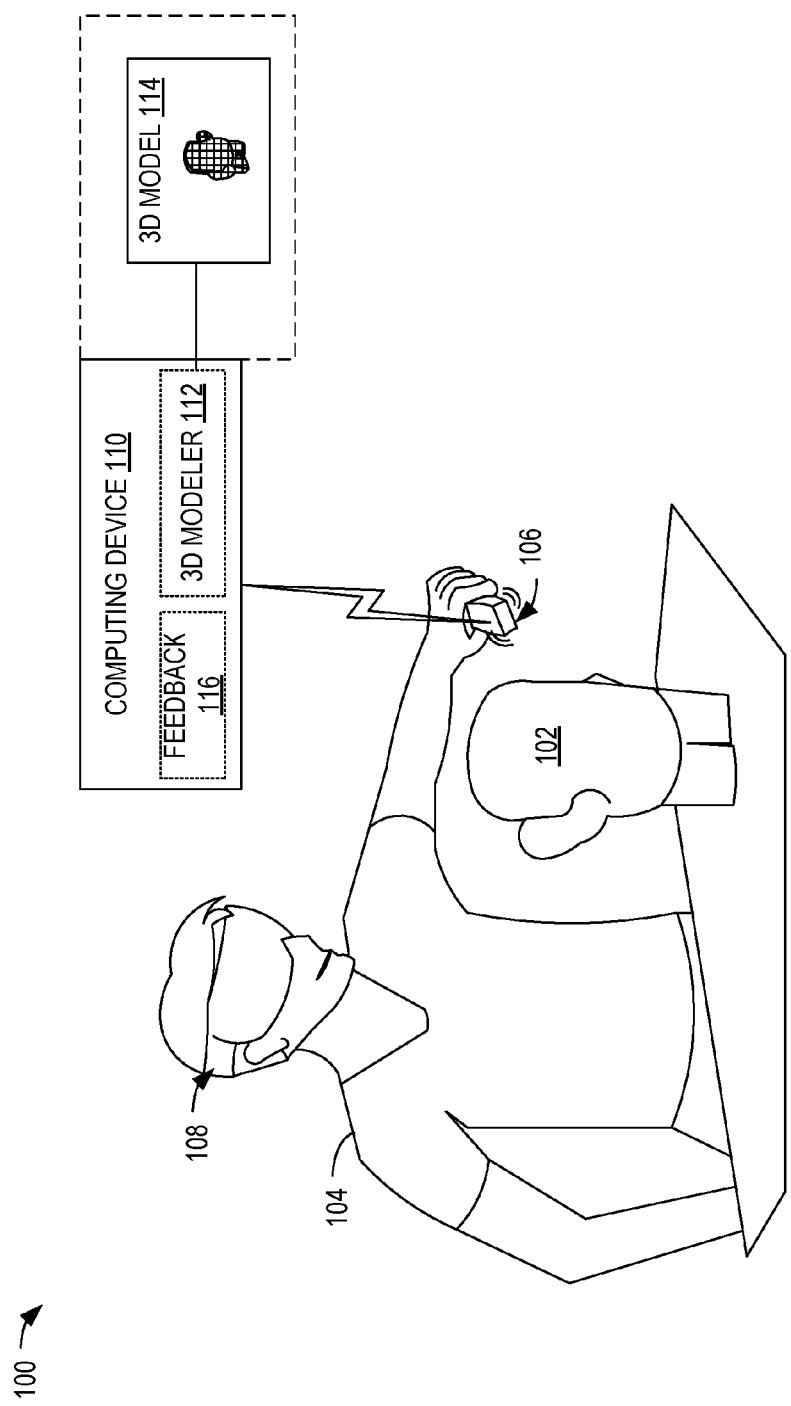
FIG. 1 shows an example object scanning environment.

FIG. 1 shows an example scanning environment 100 for scanning a physical, three-dimensional object 102. As illustrated, a user 104 may operate a scanning device 106 to measure contours of the object 102. Although illustrated as a handheld scanning device, scanning components may be integrated into another device, such as head-mounted display (HMD) device 108 in additional or alternative examples. The scanning device may output light and/or audio and receive reflected light and/or audio in order to measure the contours of the object 102. By moving the scanning device 106 around the object 102, measurements may be taken from different vantage points relative to the object in order to assess each surface of the object for modeling.

The scanning device 106 optionally may include a communications subsystem for communicating with a computing device 110. The computing device 110 may include a 3D modeler 112 that is configured to generate a 3D model of a physical object using data acquired from different vantage points to measure different perspectives of the physical object 102. In some implementations, the scanning device 106 and the computing device 110 can be implemented as separate devices that cooperate with one another (e.g., a hand-held scanning wand and a laptop computer). In other implementations, the computing device 110 and the scanning device may be integrated into a common device (e.g., a mobile phone with scanning sensors or a HMD with scanning sensors).

Whether in the same or different devices, the scanning device 106 may send at least a portion of the scanning data to the 3D modeler 112. The 3D modeler 112 may identify the relationship of the scanning data to a given perspective or vantage point of the physical object based on any suitable information. For example, the user 104, scanning device 106, and/or metadata for the scanning data may provide information relating to the physical object 102, the relative and/or absolute pose of the scanning device, and/or other information for generating the 3D model of the physical object. Further, the 3D modeler may include algorithms for determining at least some of the information for generating the 3D model of the physical object. For example, the 3D modeler may correlate positional information received from the scanning device 106 and/or another positioning device (e.g., a camera imaging the scanning device 106 and/or object 102) with a known location of the object 102 and/or with other measurements of the object 102. In this way, measurements received at the 3D modeler from the scanning device may be attributed to an appropriate portion of a 3D model 114 generated by the 3D modeler.

The computing device 110 may further include a feedback module 116 for providing feedback regarding the scanning operation. The feedback module 116 may generate and/or transmit instructions to control a device to provide the feedback. For example, the feedback module 116 may generate and/or transmit instructions to the scanning device 106 to control haptic actuators of the scanning device to output haptic feedback. As another example, the feedback module 116, may generate and/or transmit instructions to the HMD device 108 to display the 3D model and/or another indicator relating to the scanning operation.

Figure 2:
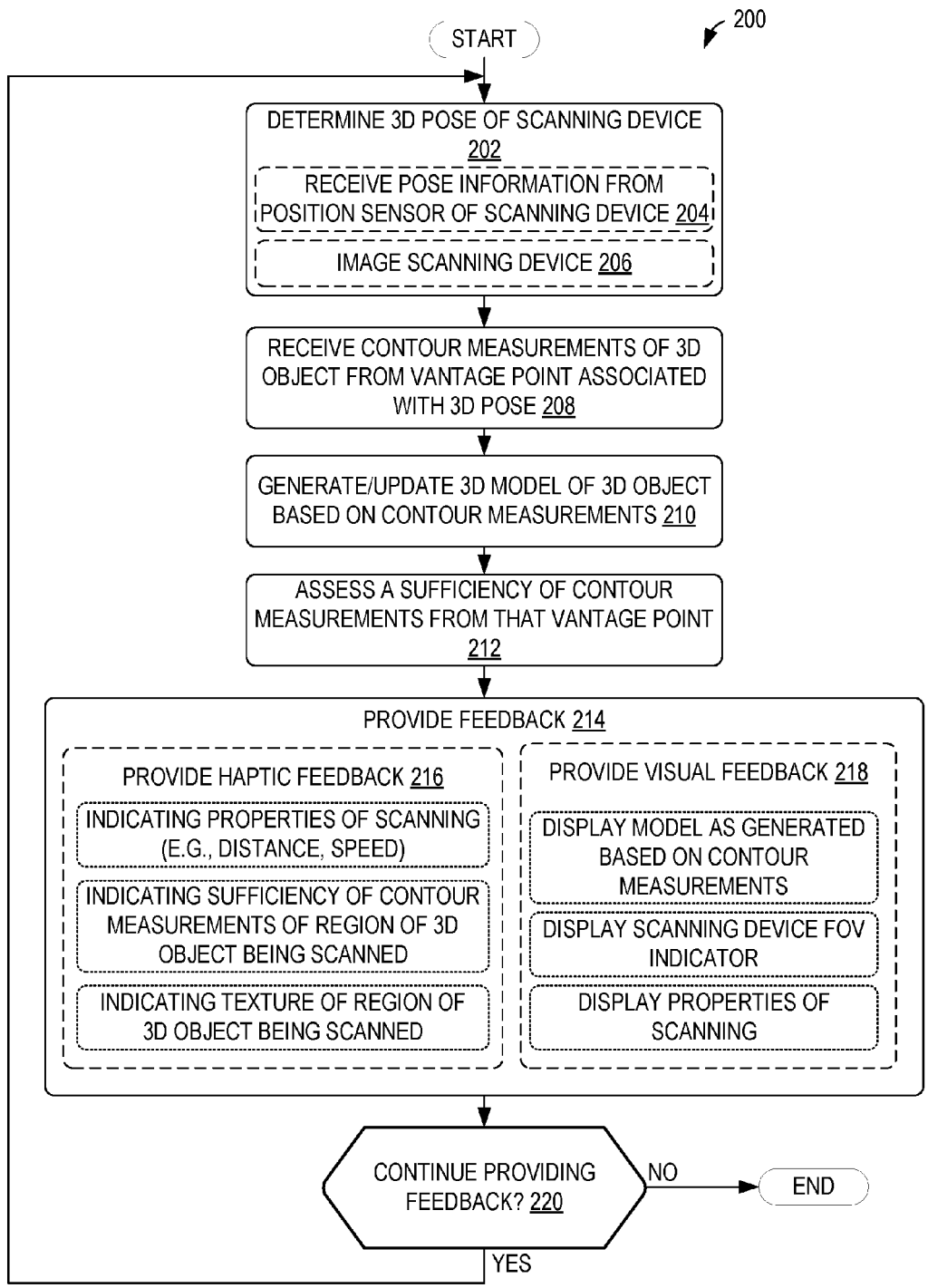
FIG. 2 shows a flow chart of an example method of scanning a three-dimensional object and providing feedback regarding the scan.

FIG. 2 is a flow chart of a method 200 of performing a scanning operation and providing feedback relating to the scanning operation. Method 200 may be performed by a computing device and/or system, such as computing device 110 of FIG. 1. At 202, the method includes determining a three-dimensional pose of a scanning device. As indicated at 204, the three-dimensional pose of the scanning device may be determined by receiving pose information from a position sensor of the scanning device. For example, the pose information may indicate a location of the scanning device in three-dimensional space and/or an orientation of the scanning device. The scanning device may include an IMU, such as a gyroscope, an accelerometer, a magnetometer, a camera, and/or another sensor capable of determining the above-described pose information and/or tracking movement of the scanning device with six degrees of freedom.

The pose information from the scanning device may be mapped to a coordinate space that is shared with another component of an object scanning system. For example, the scanning device may be imaged by a remote imaging device, as indicated at 206. The imaging device may be incorporated in and/or be in communication with the computing device. For example, the imaging device may be incorporated in an HMD, such as HMD device 108 of FIG. 1. The imaging device may be utilized to provide additional position information for the scanning device relative to the object being modeled. Accordingly, mapping the pose information from the scanning device to the coordinate space of the imaging device may correlate the pose of the scanning device with an associated vantage point relative to the object. In additional or alternative examples, the pose information may be mapped to a coordinate space associated with a display device. In this way, and as discussed in more detail below, displayed data may be positioned relative to a pose of the scanning device by utilizing a shared coordinate space.

Figure 3:
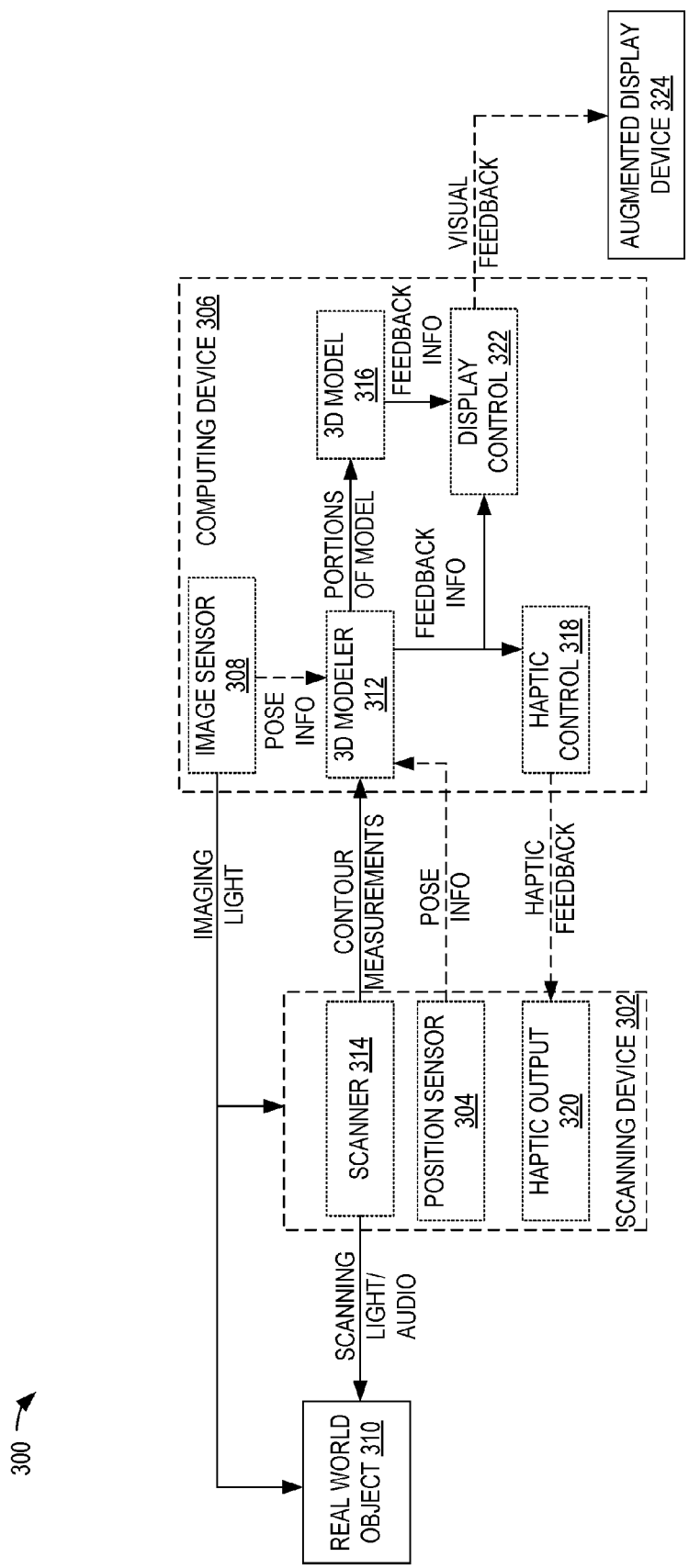
FIG. 3 shows example communications between elements of an object scanning feedback system.

Turning briefly to FIG. 3, a block diagram of an example scanning system 300 is shown, which illustrates some of the communications between components of the scanning system as described in method 200 of FIG. 2. For example, FIG. 3 shows a scanning device 302 including a position sensor 304. A computing device 306 including an image sensor 308 is also illustrated. The image sensor 308 may output imaging light and/or otherwise capture an image of the scanning device 302 and/or a real world object 310 (e.g., an object that is the target of scanning by the scanning device, as discussed below). Accordingly, pose information regarding a position and/or orientation of the scanning device 302 may be sent from the position sensor 304 and/or the image sensor 308 to a 3D modeler 312 of the computing device 306.

If pose information is received from both the position sensor 304 and the image sensor 308, the pose information from each source may be expressed in the same coordinate space and/or mapped to a shared coordinate space. For example, the pose information may indicate the pose of the scanning device relative to the real world object 310 or another reference position in physical space. In other examples, the pose information may indicate an absolute pose of the scanning device (e.g., based on global positioning system [GPS] coordinates such as latitude/longitude measurements and cardinal directions).

Returning to FIG. 2, at 208 the method 200 includes receiving contour measurements of a 3D object from a vantage point associated with the determined 3D pose. As discussed above, real world object 310 of FIG. 3 may be a target of scanning device 302. Accordingly, a scanner 314 may output scanning light (e.g., infrared light in examples where the scanner is an optical scanner such as an infrared scanner or depth camera) and/or audio (e.g., ultrasound in examples where the scanner is an audio scanner such as an ultrasound transducer/imaging device) toward the real world object 310. In other examples, the scanner may capture images of the real world object using ambient light (e.g., without outputting illumination/scanning light) and/or may utilize other scanning technologies, such as thermal imaging.

As a result of the scanning operation, the scanner 314 may measure contours of the real world object 310 within a field of view of the scanner from a given vantage point. For example, if the scanning device is positioned to scan a rear of the real world object (similarly to the arrangement illustrated in FIG. 1), the scanner 314 may receive reflections of output scanning light, audio, etc. from the rear of the object indicating corresponding physical features. These contour measurements may be sent to the 3D modeler 312 of the computing device 306.

As discussed above, the 3D modeler 312 may also receive pose information of the scanning device 302, and thus may associate the received contour measurements with a last-determined pose of the scanning device. In this way, the 3D modeler may identify a vantage point from which the contour measurements were received, which indicates a region of the real world object 310 that includes the measured contours. For example, the 3D modeler may determine an intersection of a field of view of the scanner 314 at a current pose (e.g., based on the pose information) with the real world object (e.g., as imaged by image sensor 308 and/or based on a known position of the object). The regions of the real world object within the field of view of the scanner 314 may then be associated with the contour measurements received from that vantage point.

Returning to FIG. 2, the method includes generating and/or updating a 3D model of the 3D object based on the contour measurements, as indicated at 210. Accordingly, as the contour measurements are received at the 3D modeler 312 of FIG. 3, associated portions of the 3D object may be modeled to build 3D model 316, which may be stored on a storage device of computing device 306 and/or in communication with computing device 306. For example, if the scanner measures contours of a right-rear portion of the real world object 310, the contour measurements may be sent to the 3D modeler 312 and correlated with a vantage point corresponding to the pose of the scanning device 302. The vantage point in this example may correspond to the scanning device positioned at a rear of the object and oriented such that the scanner 314 is aimed toward the right rear of the object. The 3D modeler 312 may then update the 3D model 316 to include contours identified by the contour measurements at a right-rear portion of the 3D model 316. In this way, measured contours of a given region of the real world object 310 may be replicated at the same region of the 3D model 316. As used herein, generating/updating the model includes acquiring scan data that will be subsequently used to produce a three-dimensional model during a subsequent modeling procedure—for example when insufficient data is present for progress-based modeling.

Due to properties such as sampling rate and field of view/range of the scanning device, contour measurements from a given vantage point of the scanning device may not capture all contours of a region of an object corresponding to that vantage point sufficiently. Accordingly, the method 200 of FIG. 2 may include assessing a sufficiency of contour measurements from the vantage point, as indicated at 212. For example, a sufficiency of contour measurements may be associated with one of two possible values (e.g., sufficient or not sufficient) or one of many possible values (e.g., a percentage of sufficiency). Contour measurements that are not sufficient and/or that are not at a high value of sufficiency may negatively affect the overall quality of a 3D model of the 3D object. The sufficiency of contour measurements may be determined based upon a resolution of the scanning data, an amount of the object at a given vantage point captured by the scan, an amount of time that the scanner has maintained a pose associated with the vantage point (e.g., based on a sampling rate of the scanner), an ability of a downstream modeling algorithm to process the data, and/or any other characteristic of the scan/contour measurements that affects the overall quality of the 3D model.

As an illustrative example, if a scanner takes 5 ms to acquire measurements across an associated field of view, but the scanner is only held at a given vantage point for 3 ms, the contour measurements associated with that vantage point may be insufficient. The contour measurements that were captured during the 3 ms from the given vantage point may be processed by a 3D modeler and used to partially update an associated portion of the 3D model. The associated portion of the 3D model may be completed once the scanner acquires sufficient contour measurements from that vantage point. In this way, the sufficiency of contour measurements of an object from a vantage point may correspond to the level of completion of an associated portion of a 3D model of the object.

At 214, the method includes providing feedback relating to the scanning operation. The feedback may include haptic feedback, as indicated at 216, and/or visual feedback, as indicated at 218. For example, one or both types of feedback may be provided, simultaneously and/or at different times relative to one another. Haptic feedback may be provided via one or more haptic actuators integrated in a device, such as the scanning device (e.g., scanning device 106 of FIG. 1 and/or 302 of FIG. 3) and/or another computing device (e.g., computing device 110 of FIG. 1, HMD device 108 of FIG. 1, and/or computing device 306 of FIG. 3). For example, and with reference to FIG. 3, the 3D modeler 312 may send feedback information to a haptic control 318, which may provide haptic feedback instructions to a haptic output 320 of the scanning device. The haptic actuators may thus provide haptic feedback (e.g., directional haptic feedback) to a user in contact with the haptic output device.

The haptic feedback may be provided in order to inform a user of a progress of the scan and/or other properties of the scanning operation. For example, as shown in FIG. 2, the haptic feedback may indicate properties of the scanning, such as a distance of the scanner from the object, a speed of movement of the scanner, a direction of movement of the scanner, and/or other properties of the scanning. In some examples, feedback regarding each of the properties may be provided in relation to an associated targeted scanning property. In an illustrative example, based on a sampling rate of the scanner, sufficient contour measurements may be only acquired if the scanner is moved at or below a threshold speed. In such an example, the haptic feedback may be adjusted based on a speed of the scanner relative to the threshold speed. For example, the intensity (e.g., the number of actuators that are activated and/or the amount of movement of the activated actuators) and/or frequency of haptic output may increase as the speed of the scanner nears and/or increases beyond the threshold speed. The haptic actuators may not be activated or may provide a relatively low intensity/frequency of movement (e.g., relative to outputs for speeds above the threshold) when the scanner is moved at a speed below the threshold and/or a selected amount below the threshold. In examples where multiple, individually controlled actuators may be included in a device, directional haptic output may be provided to indicate the properties of scanning (e.g., where the haptic actuators are sequentially activated in a direction moving in a first direction when the speed is below the threshold and in a second, opposite direction when the speed is above the threshold).

The haptic feedback may additionally or alternatively indicate a sufficiency of contour measurements of a region of a 3D object being scanned. For example, the haptic actuators may be controlled to output haptic feedback at a first, higher intensity and/or frequency when the scanner is scanning a region that is not sufficiently measured, and at a second, lower intensity and/or frequency (relative to the first intensity/frequency) when the scanner is scanning a region that is sufficiently (or more sufficiently) measured. In some examples the haptic feedback may indicate a texture of the 3D object being scanned. For example, higher intensity and/or frequency haptic output may be provided for surfaces with a rough texture, while lower intensity and/or frequency (relative to the higher intensity/frequency) haptic output may be provided for surfaces with a smooth texture (e.g., smoother than the rough texture). The number and/or position of haptic actuators providing haptic feedback may additionally or alternatively be adjusted to replicate and/or otherwise represent a texture of a currently-scanned region of the 3D object.

As shown in FIG. 3, the 3D modeler 312 may send, and/or the 3D model 316 may include, feedback information to be accessed to provide feedback information for a display control 322. Although shown as being included in the computing device, one or more of the components illustrated in FIG. 3 may be distributed across multiple devices. For example, each of a plurality of computing devices may include a different one of the image sensor, the 3D modeler, the 3D model, the haptic control, and/or the display control. The display control 322 may send visual feedback instructions to an augmented display device 324. The augmented display device may include a see-through display of a head-mounted display (HMD) device, such as HMD device 108 of FIG. 1, and/or a remote display (e.g., a monitor coupled to the computing device 306). In examples where visual feedback is provided to an augmented display device that is opaque (e.g., a computer monitor and/or tablet/mobile phone/laptop display), the display may also receive image information from the image sensor 308 including an image of the scanning environment (e.g., the real world object 310, the scanning device 302, and/or other components in a physical space).

As indicated in method 200 of FIG. 2, the visual feedback may take a variety of non-limiting forms. For example, the visual feedback may include displaying the 3D model or a partial virtualization of the object (e.g., in real-time as the model/virtualization is generated/updated based on contour measurements, and/or a translation of the scanning data that provides an indication of areas that have been/need to be scanned, as estimation of what the acquired or to-be acquired scanning data would represent, or another affordance as to what the user should do next to further progress the scanning operation). The 3D model may be displayed as an offset from the real world object being scanned in some examples. One example of an offset model is illustrated in an augmented reality view of FIG. 4. As shown, a user 402 may view a real world object 404 through a head-mounted display (HMD) device 406. A field of view 408 of the HMD device 406 is shown as including both the real world object 404 and a displayed 3D model 410 representing the real world object. The displayed 3D model is not actually present in the real world, and is only visible to user 402 viewing the real world with the assistance of HMD 406. In the illustrated example, the 3D model 410 is shown as being completely offset from (e.g., not overlapping) the real world object as viewed through the HMD device. However, in other examples, an offset 3D model may be partially offset/ partially overlapping with the real world object as viewed through the HMD device.

In some examples, the 3D model 410 may have a displayed location that is world-locked to a physical object in the real world, such as the real world object being scanned (e.g., object 404) and/or a different object (e.g., the surface on which the real world object is placed). Accordingly, the 3D model may occupy different regions of the user's field of view as the user moves around in the associated physical space. In this way, the user may view different perspectives of the 3D model by moving around the physical object to which the 3D model is tethered. In other examples, the 3D model may have a displayed location that is display-locked to a display-based location (e.g., an upper corner of the display, a center of the display, and/or another position relative to the field of view of the display). In such examples, the user may provide user input (e.g., actuate a control such as a joystick, provide a voice command, and/or otherwise instruct the display control) to rotate/move the 3D model and view the 3D model from other perspectives.

Figure 4:
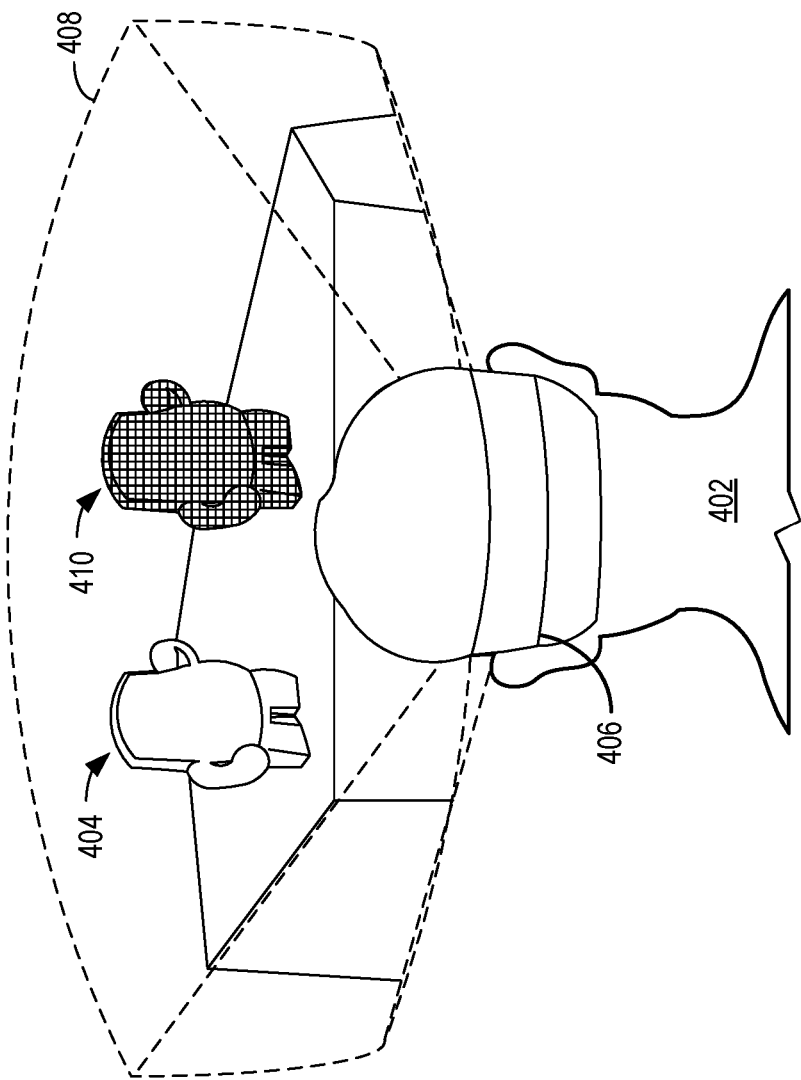
FIG. 4 shows an example augmentation including an offset model of a scanned three-dimensional object as viewed through a head-mounted display (HMD) device.
Figure 5:
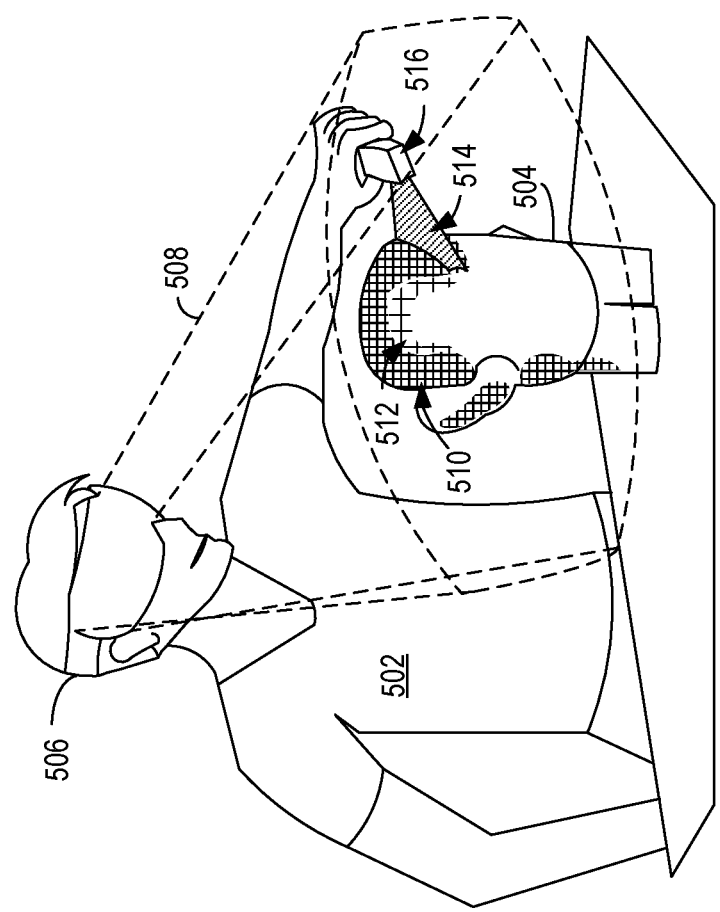
FIG. 5 shows an example augmentation including an overlaid model of a scanned three-dimensional object as viewed through an HMD.

The 3D model may additionally or alternatively be displayed as an overlay over (e.g., appearing within or nearby regions of) the associated real world object being scanned. An example of an overlaid model is illustrated in FIG. 5. As shown therein, a user 502 may view a real world object 504 through a see-through display of an HMD device 506, which has a field of view 508. While FIG. 4 shows an example of a completed 3D model shown as an offset of the scanned object, FIG. 5 shows an example of a partially completed 3D model shown as an overlay of the scanned object, where regions of the scanned object that have been sufficiently scanned are overlaid with an associated portion of a 3D model 510. An appearance of each portion of the 3D model may include visual features that are changed based on a sufficiency of contour measurements corresponding to that portion. For example, the top edge portion of the real world object 504 may be overlaid with the associated completed portion of the 3D model 510 having a first visual property (e.g., a tight grid). Regions toward the center of the top portion (indicated at 512) of the real world object 504 may be overlaid with the associated incomplete portion of the 3D model having a second visual property (e.g., a grid with wider spacing between lines than the tight grid used for completed portions of the 3D model). In additional or alternative examples, different colors, textures, or other visual properties may be used to represent completed and incomplete portions of the 3D model based on the sufficiency of contour measurements of an associated region of the real world object. In either the offset or overlaid model display, the model may be updated in real time (or near real time).

The visual feedback may additionally or alternatively indicate a field of view of the scanning device. For example, an augmentation may be displayed (e.g., via the HMD device 506) that includes a frustrum shape 514 extending from a scanning device 516 as the scanning device is viewed through a head-mounted display device. The frustrum shape 514 may extend away from the scanning device (e.g., from a portion of the scanning device that outputs scanning light and/or sound). An end of the frustrum shape may terminate in a location of a physical object being scanned and/or air (e.g., when the field of view of the scanner does not completely intersect with the physical object—such as when the scanner is not scanning or scanning an object feature that is not as wide as the frustrum shape). As used herein, the frustrum shape may refer to at least a portion of a pyramid, a cone, a fan, and/or any other two-dimensional or three-dimensional shape that converges toward the scanning device. In some examples, the pixels of the display representing the frustrum shape may be adjacent to a real world location of the scanning device and/or pixels of the display associated with a real world view of the scanning device (e.g., when the augmented display corresponds to an opaque display).

In some examples, the augmentation indicating the field of view of the scanning device may also indicate parameters of the field of view, such as imaging strength. For example, a scanning device may provide more accurate or frequently sampled data when a scanned object is within a threshold distance of the scanning device relative to when the scanned object is beyond the threshold distance from the scanning device. In a similar manner to the way in which light from a flashlight disperses, light and/or audio output by the scanning device for imaging purposes may disperse the further the light/audio travels away from the scanning device. In order to indicate this effect, the frustrum shape may include two or more differently-displayed segments, each of the two or more segments extending from either the scanning device or an adjacent segment of the two or more segments and terminating at a different distance from the scanning device. Such segmentation can also be used to indicate a scanning device is too close for advantageous scanning.

Figure 6:
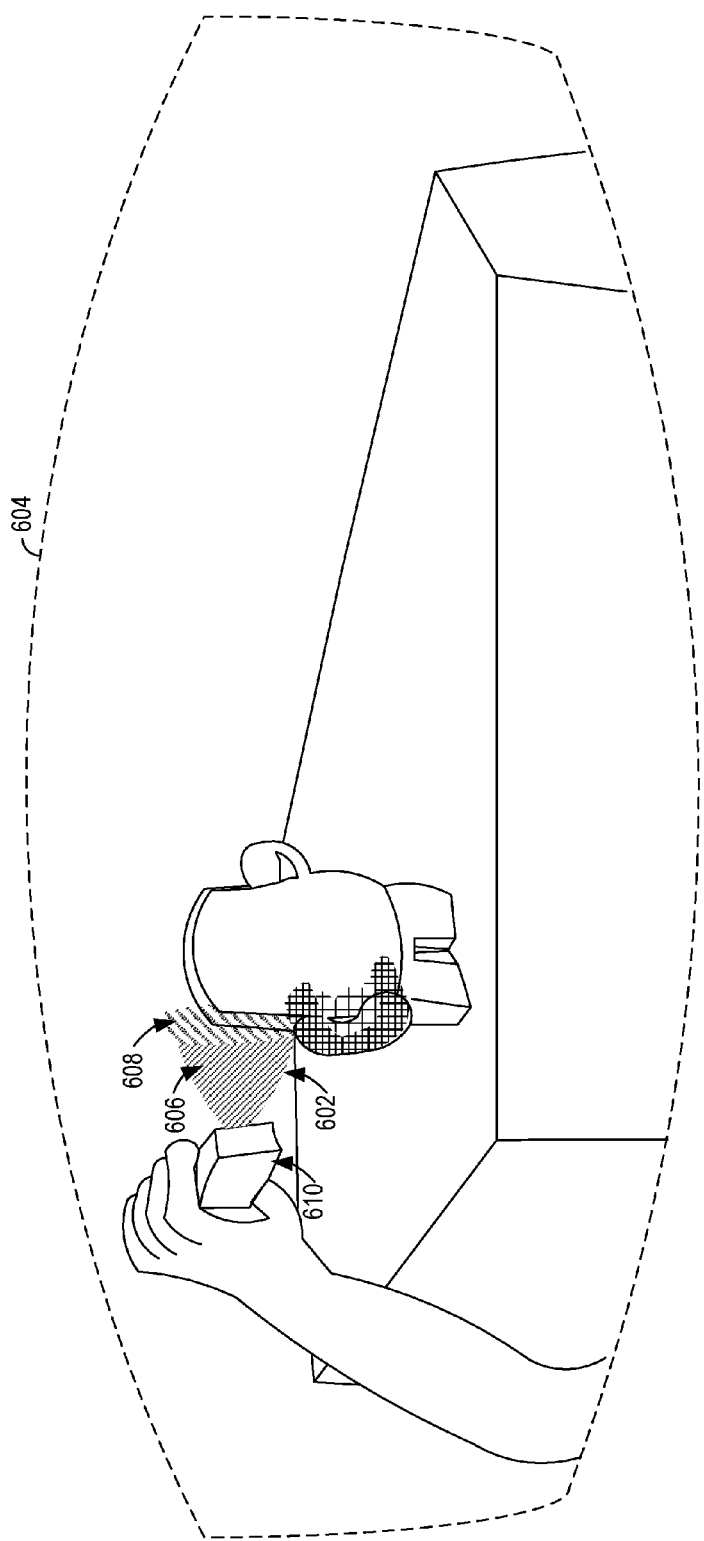
FIG. 6 shows an example augmentation including an indication of a field of view of a scanner as viewed through an HMD.

FIG. 6 shows an example of an augmentation 602 as viewed through an HMD device having a field of view 604. As shown in FIG. 6, a first segment 606 of the augmentation 602 may have a different appearance from a second segment 608. The second segment 608 is further away from a scanning device 610. Accordingly, the second segment 608 may represent a region of the field of view of the scanner in which fewer or less sufficient/complete contour measurements may be acquired relative to other regions that are closer to the scanning device. Although shown as views through an HMD device, it is to be understood that the displayed features illustrated in FIGS. 4-6 may additionally or alternatively be displayed via an opaque augmented display device, where both an image of the real world objects and the augmentations (e.g., virtual features) are displayed.

Returning to FIG. 2, the visual feedback may additionally or alternatively include indications of properties of the scanning operation. For example, the properties of scanning discussed above with respect to the haptic feedback (e.g., distance of the scanning device from the object being scanned, speed of movement of the scanning device, and/or other parameters) may be represented via displayed augmentations to the physical environment in which the object is being scanned. The properties of the scanning operation may be presented via character-based display outputs (e.g., text indicating a current speed of scanning or a current speed of scanning relative to a target speed), images, and/or other indicators of scanning properties.

At 220, method 200 includes determining if feedback is to continue to be provided. If the scanning operation is stopped (e.g., based on user request and/or based on an object not being in range of the scanner), the feedback may no longer be provided (e.g., "NO" at 220) and the method may end. If the scanning operation is continued, the feedback may continue to be provided and updated (e.g., "YES" at 220) and the method may return to 202 to continue monitoring the 3D pose of the scanning device, receiving contour measurements, and updating the 3D model.

The above-described systems and methods relate to providing real-time feedback regarding a scanning operation and a generation of an associated 3D model based on the scanning operation. The described feedback may assist a user in scanning an object efficiently and completely in order to generate the 3D model. For example, the feedback may indicate ways in which the user may adjust the scanning operation (e.g., changes in scanning speed) and/or regions of the scanned object that are to be scanned to complete the 3D model.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
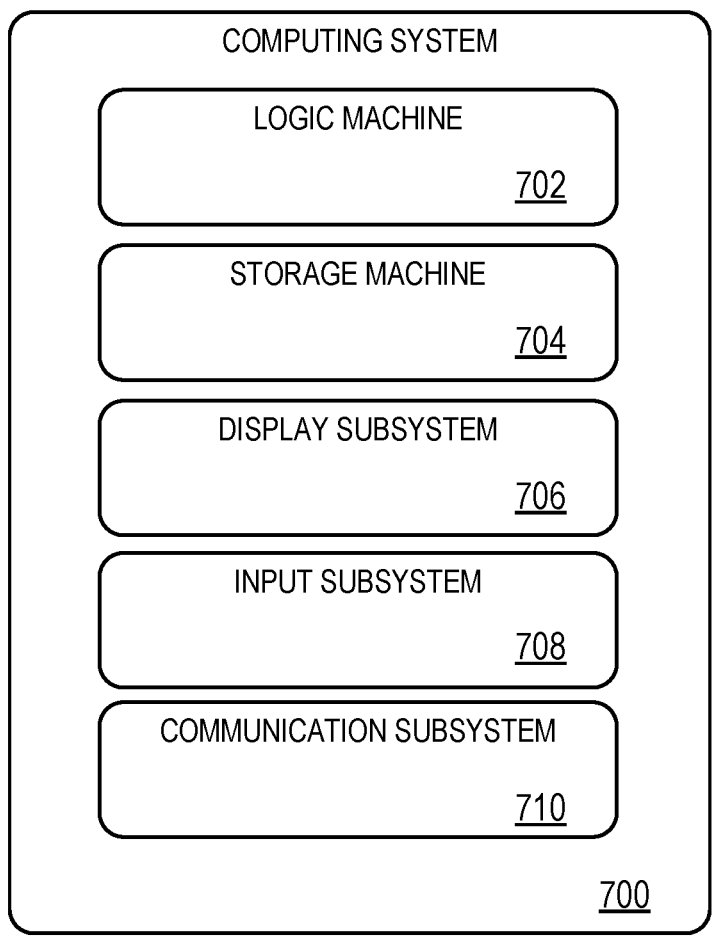
FIG. 7 schematically shows an example computing system.

FIG. 7 schematically shows a non-limiting embodiment of a computing system 700 that can enact one or more of the methods and processes described above. For example, computing system 700 may or may partially include and/or be included within computing device 110, scanning device 106, and/or HMD device 108 of FIG. 1, scanning device 302 of FIG. 3, and/or computing device 306 of FIG. 3. Computing system 700 is shown in simplified form. Computing system 700 may take the form of one or more personal computers, mobile computing devices, head-mounted display (HMD) devices, server computers, tablet computers, home-entertainment computers, network computing devices, gaming devices, mobile communication devices (e.g., smart phone), and/or other computing devices.

Computing system 700 includes a logic machine 702 and a storage machine 704. Computing system 700 may optionally include a display subsystem 706, input subsystem 708, communication subsystem 710, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein, such as method 200 of FIG. 2. When such methods and processes are implemented, the state of storage machine 704 may be transformed e.g., to hold different data. Storage machine 704 may additionally or alternatively hold data accessible by other devices, such as a fully or partially generated 3D model (e.g., 3D model 114 of FIG. 1 and/or 3D model 316 of FIG. 3) accessed by a processor and/or an external device (e.g., a display device).

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 702 executing instructions held by storage machine 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. For example, display subsystem 706 may include and/or provide display instructions to a display such as a see-through display of HMD device 108 of FIG. 1 and/or augmented display device 324. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. For example, a scanning device such as scanning device 106 of FIG. 1 and/or scanning device 302 of FIG. 3, may include a motion detection or other position sensor for determining a position and/or orientation of the device.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet. For example, scanning device 302 of FIG. 3 may include a communication subsystem to allow data (e.g., position data and/or contour measurements) to be sent to a 3D modeler of another computing device. The communication subsystem of a scanning device may also allow control data to be received from another computing device (either the computing device that includes the 3D modeler or a different computing device) to control a feedback output (e.g., a haptic output) of the scanning device.

Another example provides for a method of computer modeling a three-dimensional object, the method including computer-tracking a three-dimensional pose of a scanning device relative to the three-dimensional object as the three-dimensional pose of the scanning device changes to measure different contours of the three-dimensional object from different vantage points, assessing a sufficiency of contour measurements from one or more of the different vantage points based on measurements received from the scanning device, and providing haptic feedback, via a haptic output device, indicating the sufficiency of contour measurements corresponding to a current three-dimensional pose of the scanning device. Such an example may additionally or alternatively include the method, wherein providing haptic feedback comprises decreasing one or more of an intensity and a frequency of haptic output provided by the haptic output device as the sufficiency of contour measurements increases. Such an example may additionally or alternatively include the method, wherein providing haptic feedback comprises individually controlling each of a plurality of haptic actuators to provide directional haptic feedback to a user in contact with the haptic output device. Such an example may additionally or alternatively include the method, wherein the haptic feedback is provided to the user directly via the scanning device. Such an example may additionally or alternatively include the method, wherein the haptic feedback indicates a speed of the scanning device. Such an example may additionally or alternatively include the method, wherein the haptic feedback indicates a distance of the scanning device from the three-dimensional object. Such an example may additionally or alternatively further include providing visual feedback, via an augmented reality display, indicating the sufficiency of contour measurements. Such an example may additionally or alternatively further include providing visual feedback, via an augmented reality display, indicating a field of view of the scanning device. Any or all of the above-described examples may be combined in any suitable manner in various implementations.

Another example provides for a method of computer modeling a three-dimensional object, the method including computer-tracking a three-dimensional pose of a scanning device relative to the three-dimensional object as the three-dimensional pose of the scanning devices changes to measure different contours of the three-dimensional object from different vantage points, and displaying, via an augmented reality display, an augmented scene including an augmentation indicating a current field of view of the scanning device from a current vantage point of the scanning device. Such an example may additionally or alternatively include the method, wherein the augmentation includes a frustrum shape extending from the scanning device as the scanning device is viewed through a head-mounted display device. Such an example may additionally or alternatively include the method, wherein the frustrum shape includes two or more differently-displayed segments, each of the two or more segments extending from either the scanning device or an adjacent segment of the two or more segments and terminating at a different distance from the scanning device. Such an example may additionally or alternatively include the method, wherein the augmented scene further includes a model of the three-dimensional object. Such an example may additionally or alternatively further include forming and displaying portions of the model for which sufficient contour measurements are acquired. Such an example may additionally or alternatively include the method, wherein one or more visual properties of the model is based at least on the sufficiency of contour measurements of associated surfaces of the three-dimensional object. Such an example may additionally or alternatively include the method, wherein displaying the augmented scene comprises displaying the model of the three-dimensional object in a position that is offset from the three-dimensional object. Such an example may additionally or alternatively include the method, wherein displaying the augmented scene comprises displaying the model as an overlay on the three-dimensional object. Such an example may additionally or alternatively include the method, wherein the three-dimensional pose of the scanning device is mapped to a coordinate space shared by a head-mounted display device, and wherein the augmented scene is displayed via the head-mounted display device. Any or all of the above-described examples may be combined in any suitable manner in various implementations.

Another example provides for a device for computer modeling a three-dimensional object, the device including an interface communicatively connected to a scanning device and an augmented reality display, a logic machine, and a storage machine holding instructions executable by the logic machine to computer-track a three-dimensional pose of the scanning device relative to the three-dimensional object as the three-dimensional pose of the scanning devices changes to measure different contours of the three-dimensional object from different vantage points, and display, via the augmented reality display, an augmented scene including the three-dimensional object, the scanning device, and an augmentation indicating a current field of view from a current vantage point of the scanning device. Such an example may additionally or alternatively include the method, wherein the augmented reality display includes a head-mounted display (HMD) device, and wherein the augmentation is displayed as extending from the scanning device and intersecting the three-dimensional object as the scanning device and three-dimensional object are viewed through the HMD device. Such an example may additionally or alternatively include the method, wherein the augmented scene further includes a model of the three-dimensional object, and wherein the instructions are further executable to form and display portions of the model based at least on a sufficiency of contour measurements of surfaces of the three-dimensional object that are scanned by the scanning device from the different vantage points. Such an example may additionally or alternatively include the method, wherein the scanning device includes one or more haptic actuators, and wherein the instructions are further executable to output haptic feedback controls to the one or more haptic actuators indicating the sufficiency of contour measurements of the three-dimensional object. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of computer modeling a three-dimensional object, the method comprising:
computer-tracking a three-dimensional pose of a scanning device relative to the three-dimensional object as the three-dimensional pose of the scanning device changes to measure different contours of the three-dimensional object from different vantage points;
assessing a sufficiency of contour measurements from one or more of the different vantage points based on measurements received from the scanning device; and
providing haptic feedback, via a haptic output device, indicating the sufficiency of contour measurements corresponding to a current three-dimensional pose of the scanning device.

2. The method of claim 1, wherein providing haptic feedback comprises decreasing one or more of an intensity and a frequency of haptic output provided by the haptic output device as the sufficiency of contour measurements increases.

3. The method of claim 1, wherein providing haptic feedback comprises individually controlling each of a plurality of haptic actuators to provide directional haptic feedback to a user in contact with the haptic output device.

4. The method of claim 1, wherein the haptic feedback is provided to the user directly via the scanning device.

5. The method of claim 1, wherein the haptic feedback indicates a speed of the scanning device.

6. The method of claim 1, wherein the haptic feedback indicates a distance of the scanning device from the three-dimensional object.

7. The method of claim 1, further comprising providing visual feedback, via an augmented reality display, indicating the sufficiency of contour measurements.

8. The method of claim 1, further comprising providing visual feedback, via an augmented reality display, indicating a field of view of the scanning device.

9. A method of computer modeling a three-dimensional object, the method comprising:
computer-tracking a three-dimensional pose of a scanning device relative to the three-dimensional object as the three-dimensional pose of the scanning device changes to measure different contours of the three-dimensional object from different vantage points;
mapping the three-dimensional pose of the scanning device to a coordinate space shared by an augmented reality display; and
displaying, via the augmented reality display, an augmented scene including an augmentation indicating a current field of view of the scanning device from a current vantage point of the scanning device.

10. The method of claim 9, wherein the augmentation includes a frustum shape extending from the scanning device as the scanning device is viewed through a head-mounted display device.

11. The method of claim 10, wherein the frustum shape includes two or more differently-displayed segments, each of the two or more segments extending from either the scanning device or an adjacent segment of the two or more segments and terminating at a different distance from the scanning device.

12. The method of claim 10, wherein the augmented scene further includes a model of the three-dimensional object, the method further comprising forming and displaying portions of the model for which sufficient contour measurements are acquired.

13. The method of claim 12, wherein one or more visual properties of the model is based at least on the sufficiency of contour measurements of associated surfaces of the three-dimensional object.

14. The method of claim 12, wherein displaying the augmented scene comprises displaying the model of the three-dimensional object in a position that is offset from the three-dimensional object.

15. The method of claim 12, wherein displaying the augmented scene comprises displaying the model as an overlay on the three-dimensional object.

16. The method of claim 9, wherein the display device is a head-mounted display device.

17. A device for computer modeling a three-dimensional object, the device comprising:
  an interface communicatively connected to a scanning device and an augmented reality display;
  a logic machine; and
  a storage machine holding instructions executable by the logic machine to:
    computer-track a three-dimensional pose of the scanning device relative to the three-dimensional object as the three-dimensional pose of the scanning device changes to measure different contours of the three-dimensional object from different vantage points;
    map the three-dimensional pose of the scanning device to a coordinate space shared by the augmented reality display; and
    display, via the augmented reality display, an augmented scene including the three-dimensional object, the scanning device, and an augmentation indicating a current field of view from a current vantage point of the scanning device.

18. The device of claim 17, wherein the augmented reality display includes a head-mounted display (HMD) device, and wherein the augmentation is displayed as extending from the scanning device and intersecting the three-dimensional object as the scanning device and three-dimensional object are viewed through the HMD device.

19. The device of claim 18, wherein the augmented scene further includes a model of the three-dimensional object, and wherein the instructions are further executable to form and display portions of the model based at least on a sufficiency of contour measurements of surfaces of the three-dimensional object that are scanned by the scanning device from the different vantage points.

20. The device of claim 19, wherein the scanning device includes one or more haptic actuators, and wherein the instructions are further executable to output haptic feedback controls to the one or more haptic actuators indicating the sufficiency of contour measurements of the three-dimensional object.

* * * * *